United States Patent [19]

Lampert

[11] 4,133,554
[45] Jan. 9, 1979

[54] ANTI-SWAY MECHANISM FOR MOTOR VEHICLES

[75] Inventor: Albert J. Lampert, San Clemente, Calif.

[73] Assignee: Cambria Spring Company, Los Angeles, Calif.

[21] Appl. No.: 791,417

[22] Filed: Apr. 27, 1977

[51] Int. Cl.$^2$ ............................................. B60G 19/02
[52] U.S. Cl. ........................................ 280/689; 267/67
[58] Field of Search ................... 280/689, 104, 112 A; 267/67, 11, 15 R, 19 R

[56] References Cited

U.S. PATENT DOCUMENTS

| | | | |
|---|---|---|---|
| 2,083,381 | 6/1937 | Hutchison | 280/104 |
| 2,152,938 | 4/1939 | Welch | 267/66 X |
| 2,179,016 | 11/1939 | Leighton | 267/66 |
| 2,253,646 | 8/1941 | Paton | 267/11 |
| 2,471,135 | 5/1949 | Wyeth | 267/11 |
| 2,565,756 | 8/1951 | Coleman | 280/104 |
| 2,740,623 | 4/1956 | Schlegel | 267/57 |
| 2,999,694 | 9/1961 | Allison | 280/104 |
| 3,089,710 | 5/1963 | Fiala | 280/112 |
| 3,171,642 | 3/1965 | Allison | 267/67 X |
| 3,448,994 | 6/1969 | King et al. | 280/689 |
| 4,014,564 | 3/1977 | Coble | 280/689 |

Primary Examiner—Joseph F. Peters, Jr.
Assistant Examiner—Gene A. Church

[57] ABSTRACT

An anti-sway mechanism for motor vehicles in which a pair of levers transmit a reaction force transversely of the vehicle to counteract tilting moments, thereby holding the vehicle body relatively upright and distributing the weight uniformly on the wheels. The levers are connected to the body at their outer ends, connected to each other at their inner ends, and pivotable on fulcrums supported on the axle housing. An added spring assist for the vehicle suspension system is provided by the resiliency of the levers.

13 Claims, 4 Drawing Figures

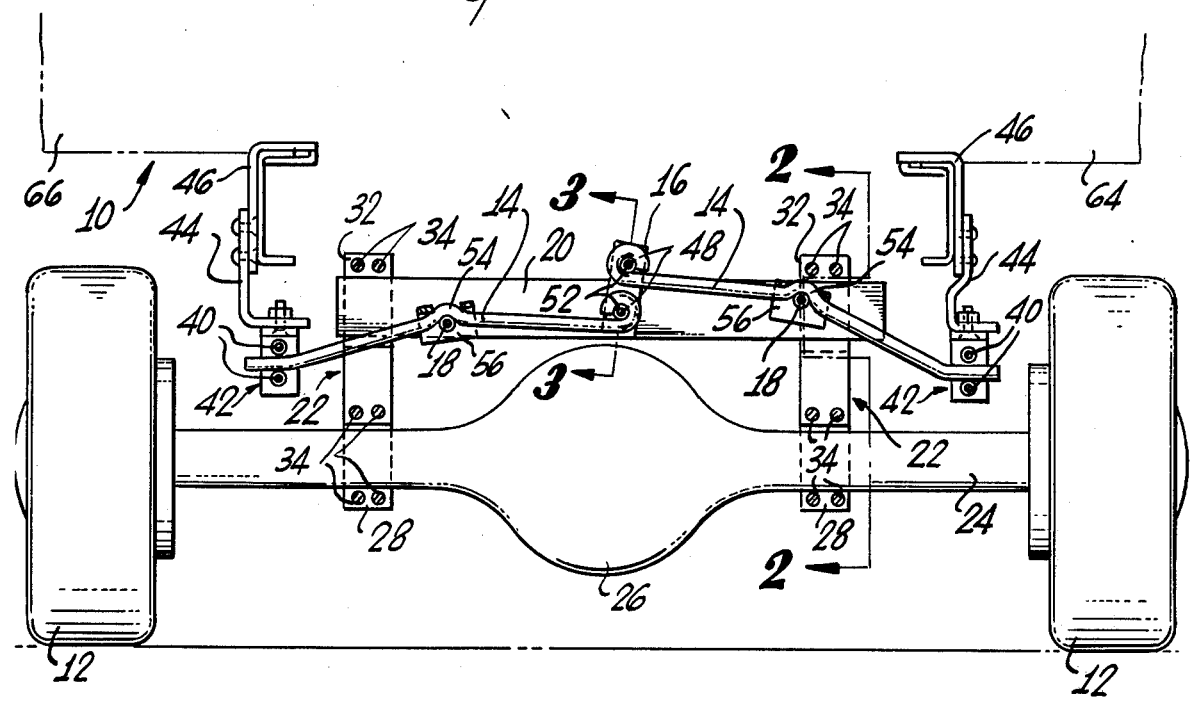
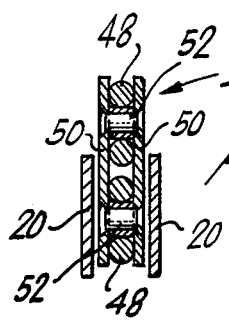

ANTI-SWAY MECHANISM FOR MOTOR VEHICLES

BACKGROUND OF THE INVENTION

The present invention relates to motor vehicle suspension systems, and more particularly to an anti-sway mechanism for incorporation in such suspension systems.

The suspension system of a motor vehicle is intended to absorb road shocks and provide a smoother, more comfortable ride while maintaining continuous firm contact between the tires and the road so that traction is not lost as an uneven surface is traversed. Conventional suspension systems permit the body of the vehicle to tilt or sway by compressing the springs on one side in response to centripetal force, wind, or a combination thereof, the angle of the body being greater in the case of a taller vehicle with a high center of gravity and a large wind surface. The tilting action displaces the center of gravity away from the centers of the axles, leading to a potentially dangerous and unstable condition with a disproportionate share of the vehicle weight transferred to one side. The effects of uneven weighting can cause the unweighted wheels to have inadequate traction, while the more heavily weighted wheels may be overloaded. In extreme cases, the weight shift can be so pronounced that the unweighted wheels lose contact with the road surface completely and the vehicle can be overturned.

A variety of anti-sway mechanisms have been proposed to eliminate tilting of vehicle bodies. These previously known mechanisms have not, however, proven entirely satisfactory. Some are too complex and expensive to manufacture, others require too much space or interfere with conventional suspension system components, and still others are simply ineffectual.

The primary objective of the present invention is to provide an improved anti-sway mechanism that overcomes the above-mentioned disadvantages of many previously known mechanisms.

SUMMARY OF THE INVENTION

The present invention provides, in general terms, an anti-sway mechanism for motor vehicles that counteracts tilting by an arrangement of levers that responds to vertical movement of one side of a vehicle body by applying a reaction force to the opposite side, keeping the body level and the wheels evenly weighted.

In a preferred form of the invention, the reaction mechanism includes a pair of levers that are pivotable on fulcrums supported by the vehicle axle housing. More specifically, the levers positioned between the axle housing and the body are connected to the body at their outer ends and connected to each other at their inner ends. The inner end connection is formed by a pivotable link and the outer end connections permit sliding movement as well as pivoting movement.

Preferably, the levers are resilient so they can flex as both sides of the body move downwardly simultaneously. The levers therefore increase the overall spring rate of the suspension system to provide the above-mentioned spring assist and guard against possible damage to the frame and axles.

Other features and advantages of the present invention will become apparent from the following detailed description, taken in conjunction with the accompanying drawing which illustrates by way of example, the principles of the invention.

DESCRIPTION OF THE DRAWINGS

FIG. 1 is an elevational view of an anti-sway mechanism and surrounding vehicle structure that incorporates the novel features of the present invention;

FIG. 2 is an enlarged cross-sectional view taken along the line 2—2 of FIG. 1 to show the bracket of the mechanism;

FIG. 3 is an enlarged cross-sectional view taken along the line 3—3 of FIG. 1 to show the connection between the levers of the mechanism; and FIG. 4 is an enlarged perspective view of a bushing included in the mechanism.

DESCRIPTION OF THE PREFERRED EMBODIMENT

The present invention resides in a novel anti-sway mechanism for motor vehicles, illustrated in the accompanying drawings, that responds to vertical movement of one side of a vehicle body 10 by applying a reaction force in the direction of movement to the opposite side, thereby counteracting any tilting moment and maintaining relatively uniform weight distribution on the wheels 12 of the vehicle. In general, it comprises a pair of reaction levers 14 attached to the vehicle body 10, a link 16 by which the levers are connected to each other, a pair of fulcrum members 18 on which the levers pivot, a pair of cross-pieces 20 on which the fulcrums are supported, and a pair of brackets 22 by which the cross-pieces are attached to an axle housing 24.

The brackets 22 are clamped to the axle housing 24 on either side of a differential 26 so that they extend vertically, as shown in FIG. 2. Each bracket 22 is formed by a pair of parallel, upstanding front and rear lower plates 28 having arcuate lower ends 30 that directly engage the axle housing 24 between them. A pair of upwardly extending front and rear upper plates 32 are attached to the opposing inner surfaces of the lower plates 28, and the entire bracket 22 is held together by a plurality of through bolts 34 with surrounding cylindrical spacers 35. The top ends of the upper plates 32 are bent to define two opposing recesses 36 that receive the flat, elongated cross-pieces 20 which extend transversely of the vehicle above the axle housing 24 and connect the brackets 22. The cross-pieces 20 are clamped to the upper plates 32. Set inwardly from the brackets 22 and on opposite sides of the longitudinal center axis of the vehicle are a pair of fulcrum members 18 in the form of short horizontal pins that span the distance between the cross-pieces 20.

The reaction levers 14, which are the heart of the mechanism, are resilient spring members that each extend transversely of the vehicle, above the axle housing 24, and through one of the brackets 22, resting on the fulcrum pin 18 nearest that bracket, as shown in FIG. 1. On each side of the vehicle body 10 the outer end of one lever 14 is received between two cylindrical lugs 40 of a fitting 42 carried by a member 44 attached to the edge of the body by a leg 46. The distance between the lugs 40 is slightly greater than the diameters of the levers 14 to permit the ends of the levers to pivot through a small angle and slide longitudinally within the fitting 42 as the body 10 moves vertically relative to the axle housing 24.

The inner ends of the levers 14 form eyes 48 which are normally positioned one above the other over the differential 26 and substantially at the center of the axle housing 24. A pivotable connection between the levers 14 is formed by a short connecting link 16. As shown in FIG. 3, the link 16 is formed by two parallel side plates 50 joined by two spaced-apart, parallel pivot pins 52, the pins being loosely engaged by the eyes 48. Only the levers 14 are connected to and support the link 16.

At the horizontal center of each lever 14 is a crook 54 forming a notch on its bottom side in which one of the fulcrum pins 18 is received. To secure the lever 14 to the pin 18, a U-shaped bushing 56, as shown in FIG. 4, sits atop the lever with the pin inserted through circular apertures 58 in its side walls 60. A slot 62 is cut in the top of the bushing 56 to receive the upwardly projecting top of the crook 54.

The entire anti-sway mechanism is contained between the axle housing 24 and the body 10 of the vehicle in a space that is otherwise unused, where it does not interfere with the operation of the suspension system. In the drawings, conventional suspension system components, such as leaf springs and shock absorbers, are omitted for clarity.

The foregoing structure counteracts tilting moments of the vehicle body 10 in the following manner. If one side 64 of the body 10 begins to move downwardly in response to centripital force, for example, the outer end of the lever 14 on that side is urged downwardly by the lug 40, and the lever pivots in a vertical plane on its fulcrum pin 18 raising its inner end and the link 16. The brackets 22 hold the fulcrum pins 18 in a fixed position relative to the axle housing 24, as the suspension system permits the body 10 to move. Since the inner end of the opposite lever 14 is also connected to the link 16, it must pivot on its fulcrum pin 18 in a similar manner, and its outer end exerts a reaction force via the lugs 40 on the opposite side 66 of the body 10. Thus, a portion of the downward force originally applied to one side 64 to the vehicle is transmitted by the levers 14 to the opposite side 66 to maintain the body 10 in a relatively level attitude and distribute the increased load over the wheels 12 on both sides.

In addition to minimizing tilting, the anti-sway mechanism of the invention distributes the added load over both sides of the suspension system to protect the system from damage and prevent bottoming. The levers 14 also act as a spring assist, even if the load is distributed uniformly on both sides of the vehicle, since the levers can flex allowing their outer ends to move downwardly simultaneously to absorb road shocks. In the event of such simultaneous downward movement, it is particularly noteworthy that the effective combined length of the levers 14 can be increased by a shift of the link 16 from a generally vertical position toward a generally horizontal position and the levers can slide within the lugs 40. These articulate movement capabilities of the levers 14 are, however, of importance in counteracting asymmetical forces as well.

It will be apparent that the invention is a highly effective but relatively simple and compact mechanism for preventing tilting of a vehicle body that also acts as a spring assist. While a particular form of the invention has been illustrated and described, it will be apparent that various modifications can be made without departing from the spirit and scope of the invention.

I claim:

1. For a vehicle having an axle housing and a body supported above the axle housing by a suspension system, an anti-sway mechanism that reduces tilting of the body relative to the axle housing and promotes uniform weight distribution on the wheels of said vehicle comprising:
    reaction means connected to the body at predetermined points on the sides thereof for responding to vertical movement of one side of said body relative to said axle housing by applying a reaction force in the direction of said movement to the opposite side of said body;
    a pair of fulcrum members on which said reaction means is pivotable within a substantially vertical plane; and
    support means attached to said axle housing for supporting said fulcrum members.

2. The anti-sway mechanism of claim 1, wherein said reaction means is resilient for acting as a spring assist.

3. The anti-sway mechanism of claim 1, wherein said reaction means includes a pair of levers connected to said body at their outer ends and connected to each other at their inner ends.

4. The anti-sway mechanism of claim 3, wherein said levers are resilient.

5. The anti-sway mechanism of claim 3, wherein said levers are pivotably connected at their inner ends by a link.

6. The anti-sway mechanism of claim 5, wherein each of said fulcrum members is positioned between said link and a connection of said reaction means to said body.

7. The anti-sway mechanism of claim 1, wherein said reaction means comprises a pair of levers and means for connecting said levers to said body while permitting sliding movement of said levers therein.

8. The anti-sway mechanism of claim 7, wherein said connection means includes a pair of lugs between which said lever is slidably received.

9. The anti-sway mechanism of claim 7 further comprising a link including two spaced-apart parallel pins, each of said levers having an eye on one end thereof that pivotably engages one of said pins.

10. For a vehicle including an axle housing and a body supported above the axle housing by a suspension system, an anti-sway mechanism that reduces tilting of the body relative to the axle housing and promotes uniform weight distribution comprising:
    a pair of fulcrum members disposed above said axle housing and beneath said body;
    a cross-piece supporting said fulcrum members;
    a pair of brackets attached to said axle housing and supporting said cross-piece in a fixed position with respect thereto;
    a pair of resilient levers pivotable on said fulcrum members;
    a link pivotally connecting said levers at their inner ends; and
    means for connecting the outer ends of said levers to opposite sides of said body while permitting sliding movement of said levers therein;
    whereby vertical movement of one side of said body produces a reaction force transmitted by said levers that urges the opposite side of said body in the direction of said movement.

11. An anti-sway mechanism and spring assist for a vehicle comprising:
    a pair of upstanding brackets disposed on opposite sides of said vehicle, said brackets being secured to an axle housing of said vehicle;
    horizontal cross-pieces secured to the top ends of said brackets and extending along said axle housing;

a pair of fulcrum members supported by said crosspiece on opposite sides of said vehicle;

a pair of resilient levers disposed on opposite sides of said vehicle and pivotable on said fulcrum members, each of said levers being generally aligned with said axle housing and being articulately connected at its outer end to one side of said body; and a link pivotably attached to both of said levers at the inner ends thereof;

whereby vertical movement of one side of said body produces a reaction force transmitted by said levers that urges the opposite side of said body in the direction of said movement, and whereby simultaneous downward movement of both sides of said body causes flexing of said levers.

12. For a vehicle having an axle housing and a body supported above the axle housing by a suspension system, an anti-sway mechanism that reduces tilting of the body relative to the axle housing and promotes uniform weight distribution on the wheels of said vehicle comprising:

reaction means connected to opposite sides of the body for responding to vertical movement of one side of said body relative to said axle housing by applying a reaction force in the direction of said movement to the opposite side of said body, said reaction means comprising a pair of levers and means for connecting said levers to said body while permitting sliding movement of said levers therein;

a pair of fulcrum members on which said levers are pivotable; and support means attached to said axle housing for supporting said fulcrum members.

13. The anti-sway mechanism of claim 3 further comprising link means for connecting said levers at their inner ends while permitting vertical movement of said inner ends as said body and axle housing move relative to each other.

* * * * *